United States Patent [19]

Schmitt

[11] Patent Number: 5,494,109
[45] Date of Patent: Feb. 27, 1996

[54] BACKFLUSH FILTER SYSTEM FOR DOWNHOLE PUMPS

[75] Inventor: Kenneth J. Schmitt, Spring, Tex.

[73] Assignee: Stren Company, Houston, Tex.

[21] Appl. No.: 375,463

[22] Filed: Jan. 19, 1995

[51] Int. Cl.[6] .......................... B01D 29/66; E21B 37/08; E21B 37/06
[52] U.S. Cl. .............. 166/312; 166/53; 166/68; 166/105; 166/64; 210/747; 210/108; 210/411
[58] Field of Search .................. 166/68, 53, 105, 166/369, 90, 236, 227, 228, 312, 311, 373; 210/747, 108, 170, 411, 416.5, 791.321.69, 741

[56] References Cited

U.S. PATENT DOCUMENTS

| | | | |
|---|---|---|---|
| 2,046,770 | 7/1936 | Coberly et al. | 210/108 |
| 2,049,304 | 7/1936 | Lloyd | 166/105.1 |
| 2,646,126 | 7/1953 | Goodner | 166/235 |
| 2,677,428 | 5/1954 | Clark | 166/312 X |
| 3,547,194 | 12/1970 | Morine | 166/312 X |
| 3,973,630 | 8/1976 | Wheeler et al. | 166/312 |
| 4,273,192 | 6/1981 | Saadeh et al. | 166/312 |
| 4,396,506 | 8/1983 | Damerau | 210/108 X |
| 4,478,285 | 10/1984 | Caldwell | 166/311 |
| 4,621,693 | 11/1986 | Caldwell et al. | 166/311 |
| 4,778,355 | 10/1988 | Holland | 417/378 |
| 4,940,092 | 7/1990 | Ferguson et al. | 166/311 |
| 4,969,518 | 11/1990 | Schmitt et al. | 166/228 |
| 5,042,149 | 8/1991 | Holland | 29/888 |

*Primary Examiner*—Stephen J. Novosad
*Attorney, Agent, or Firm*—Ned L. Conley

[57] ABSTRACT

A well rod pump having a filter system to remove particulate material from the fluids produced from the well and an automatic back flush system using pumped fluid to flush particulate material from the filter system in response to increased pressure differential across the filter system, including a rod moved by a piston to open the valves of the pump, and a time delay connected to continue to hold the valves open for a period sufficient to allow back flushed particles to settle in the well. Well treatment chemicals may be injected into the well with the back flushing fluid.

12 Claims, 6 Drawing Sheets

BACKFLUSH FILTER SYSTEM FOR DOWNHOLE PUMPS

BACKGROUND OF THE INVENTION

The present invention relates to the field of pumping of oil well fluids from a downhole location in an oil well to the surface adjacent the well. More particularly, the invention relates to the protection of the pump from well bore solids that can abrade or jam the pump. More particularly still, the invention relates to the filtration of solids from the well bore fluid by filter media prior to the entry of the fluids into the pump, and the downhole cleaning of the filter media to limit the need to remove the pump and filter from the well bore to replace or clean the filter after the filter has restrained amounts of the solid particulates sufficient to reduce its capacity.

Downhole pumps are placed in well bores to pump well fluids from a location within the well bore upward to the surface. Such pumps provide the energy to lift the well fluid where the natural well pressure is too low to force the well fluid to the surface. One major consideration in the cost of producing oil from low production wells is the cost of lifting the well fluid to the surface. The lifting cost is a function of original equipment cost and the cost to run, and maintain or replace the equipment, and the cost to service the well and equipment. Pumping costs are a major contributor to production costs, and marginally producing wells are commonly abandoned because the overall cost of pumping, including equipment maintenance, is too high in comparison to the value of any oil produced from the well. This is particularly true where the well is pumping from a formation which gives up produced fluid with a high abrasive particulate content. These abrasives tend to migrate with the well fluid into the pump, and contribute to high pump wear and maintenance. As a result of the presence of these particulates, rapid abrasive damage can occur on the precision pump surfaces, particularly on the critical interface of the plunger with the barrel. Additionally, many other pump components, such as critical valves, abrade in the presence of the particulates, which leads to inadequate pump performance. As a result of this wear and damage, the pump must be pulled out of the well to be repaired or replaced. Removal and reinsertion of the pump may take several hours, or several days, at significant cost to the well operator. The more abrasive the well fluid, the more often the pump must be pulled for servicing and repair.

U.S. Pat. No. 4,969,518, Schmitt, et al., fully incorporated herein by reference, discloses a significant improvement in pump structure that permits a significant increase in pump downhole time, i.e., the length of time the pump remains in the hole pumping, before it must be removed for service. This improvement is provided by a filter member having tortuous paths therein that decrease in size from the well side to the pump side of the filter. Additionally, the filter includes a trip member that allows fluid to bypass the filter if the filter should become clogged while still in service. This filter provides substantial protection to the pump, and permits the pump to remain in the well bore for longer periods without service or replacement, and thus lowers the cost of pump maintenance, repair or replacement.

Despite the technological advance of the invention described in U.S. Pat. No. 4,969,518, there was still a need to pull the pump after the filter media capacity is reduced by becoming clogged, or loaded. For example, on a well in Wyoming with a history of requiring pump repair every 7 days, the filter media of the '518 patent increased the pump downhole time to 214 days. However, despite the tremendous decrease in lift cost associated with such an increase in downhole time, the pump still has to be removed for filter replacement and pump inspection/service.

The invention of my copending application Ser. No. 08/100,612, filed Jul. 30, 1993, now U.S. Pat. No. 5,413,721, the disclosure of which is incorporated herein by reference, provided a significant improvement over the '518 invention. That invention provided a downhole cleaner which, in cooperation with the pump, forces well bore particulates outwardly from the filter upon a preselected reduction in filter efficiency exhibited by a preselected pressure differential across the filter media of the filter, which cleans the filter in place in the well bore and permits continued use of the filter and pump without the need to pull the pump to clean or replace the filter.

In this invention, however, in some installations it was necessary or desirable to stop the sucker rod pump after the filter was cleaned for long enough to make sure that particles forced from the filter had time to settle to the bottom of the well bore and thereby avoid starting flow of well bore fluids which still contained a high proportion of particulate matter. This required the presence of an operator at the surface to turn the pump off and on or the use of special surface equipment to automatically delay the initiation of pumping operations.

SUMMARY OF THE INVENTION

The present invention integrates a back flush filter system with a rod pump to form a new rod pump system which automatically flushes particulate material from the filter, at the same time holding open both the standing valve and the travelling valve, and automatically holding them open for a long enough time to insure that high pressure fluid in the production tubing can clean the filter. After flushing the particulate material from the filter, the pumping system continues a pre-calculated dwell sequence that allows the discharged particles to settle into the rat hole. When the dwell timing mechanism senses the completed cycle, it automatically returns to normal pumping operation.

BRIEF DESCRIPTION OF THE DRAWINGS

These and other features and improvements will become apparent from the brief description of the preferred embodiment, when read in conjunction with the drawings, wherein.

DESCRIPTION OF THE EMBODIMENTS

Figures 1, 2A:
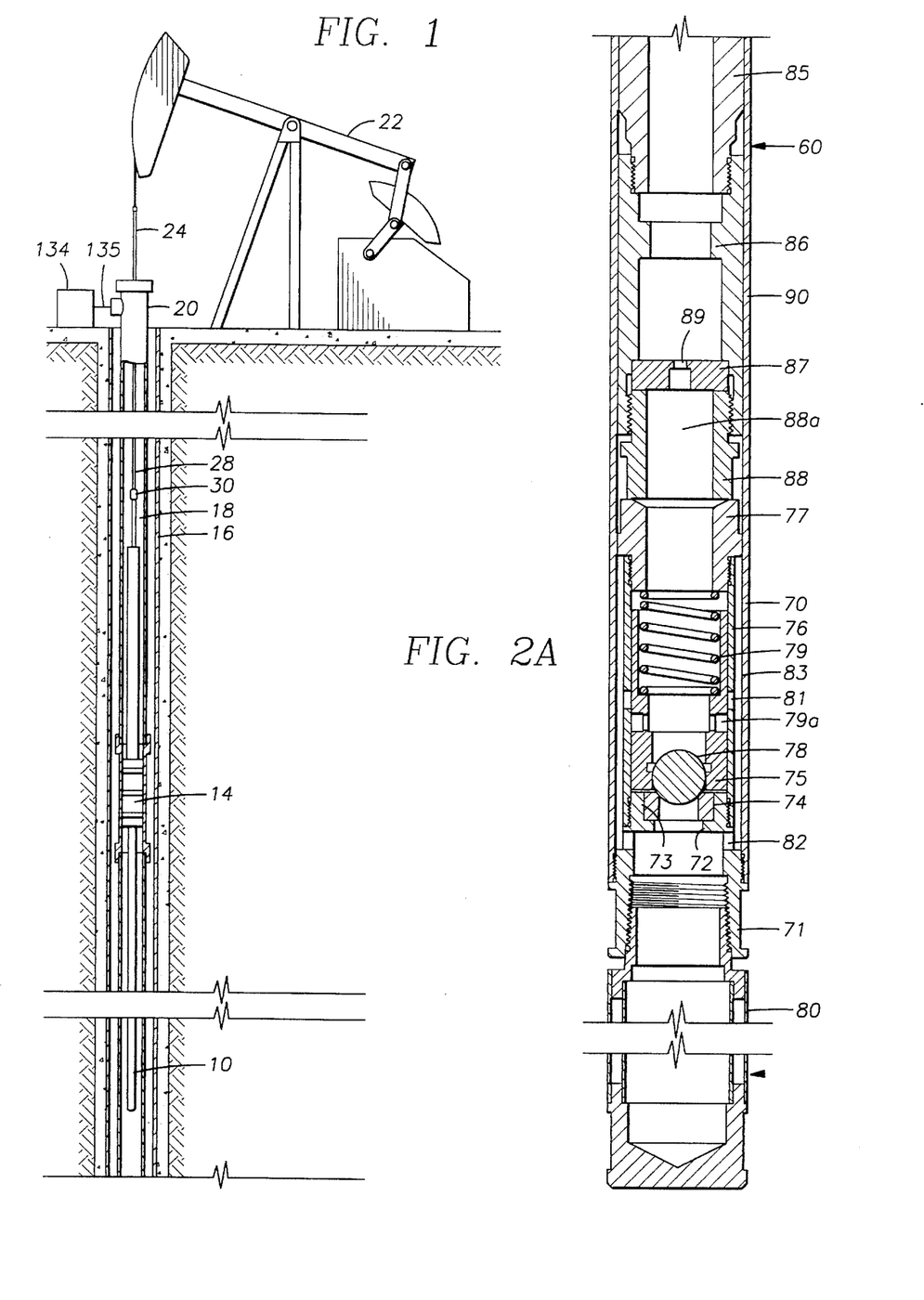
FIG. 1 is a vertical sectional view of a pumping system incorporating the automatic filter cleaning system of the present invention and located in the well tubing of a well bore.
FIGS. 2A–2F are enlarged vertical sectional views of sections of one embodiment of the invention of FIG. 1 during pumping operations, with FIG. 2A illustration the bottom section and progressing upwardly to FIG. 2F illustrating the uppermost section.

FIG. 1 illustrates a conventional pumping jack 22 with a polish rod 24 suspended from the pumping jack and extending downwardly through a wellhead 20 and well tubing 18 within the casing 16 of an oil well. The polish rod is connected to a string of sucker rods 28 which in turn is connected to a sucker rod sub 30. The sucker rod sub reciprocates a plunger rod 32 within the barrel 40 of a sucker rod pump to induce well fluids to flow upwardly through the barrel and the tubing to be produced through the wellhead 20 at the surface of the ground. The pump is supported in the tubing by a hold-down unit 14, and an automatically operated filter cleaning unit 10 is supported below the hold-down unit.

As will be later described, the barrel of the pump contains a reciprocable pump plunger, standing and traveling valves, a reference cell, and a trigger sub for operating the reference cell to mechanically open the traveling valve.

Below the pump barrel is a filter section 50 for filtering well fluids that are produced through the pump and below the filter section 50 is engine section 60 which provides power for operating the reverse flush operation. Connected below the engine section is a sensor valve assembly 70 which responds to differential pressure to cause the reverse flushing operation. A sensor valve filter 80 attached to the lower end of the sensor valve completes the assembly.

Reference is now made to FIGS. 2A to 2F for a detailed description of one embodiment of the system of this invention.

As seen in FIG. 2A, the sensor valve filter 80 consists of one or more annular permeable members having perforations through which well fluid may flow but which will filter out a major portion of particulate material which may be carried with the well fluid. The sensor valve filter is threadingly connected to a coupling 71 which forms the lower end of the sensor valve assembly 70. The coupling is threadingly connected to a tubular housing member 90 which contains the sensor valve assembly 70 and the engine section 60. The upper end of the coupling 71 has an axial passageway 72 and a cup shaped counterbore 73 which is proportioned to receive an annular valve seat 74. A tubular sensor valve assembly housing 76 is mounted concentrically on the coupling and extends upwardly therefrom to a valve head 77. The housing 76 is substantially concentrically disposed within housing member 90, leaving an annular space 76a between them. Fluid communication is provided between the annular space 76a and the interior of coupling 71 by ports 71a in the upper wall of the coupling. A spool valve 75 is longitudinally slidably received within the housing 76 and includes at its lower end a ball valve 78 which is retained in sealing engagement with the valve seat 74 by means of a compression spring 79 which extends between a shoulder on the spool valve and the lower end of the valve head 77. The ball valve is sealably retained within a counterbore in the lower end of the spool valve, the seal being provided by any suitable means as for example, an O-ring. The spool valve is provided with one or more radial openings 79a and the sensor valve housing 76 also has one or more corresponding radial openings 81. The spool valve has a length which is less than the distance between the end of the coupling 71 and the lower end of the valve head 77, the difference in distance being substantially equal to the longitudinal distance between the centers of the spool valve radial openings and the valve housing radial openings, so that when the spool valve moves to the upper end of its allowed movement the radial openings are aligned.

Radial openings 82 are provided in the upper end of the coupling to provide a fluid path from the interior of the coupling into an annulus 83 between the tubular housing member 90 and the sensor valve housing 76.

Figures 2B, 3:
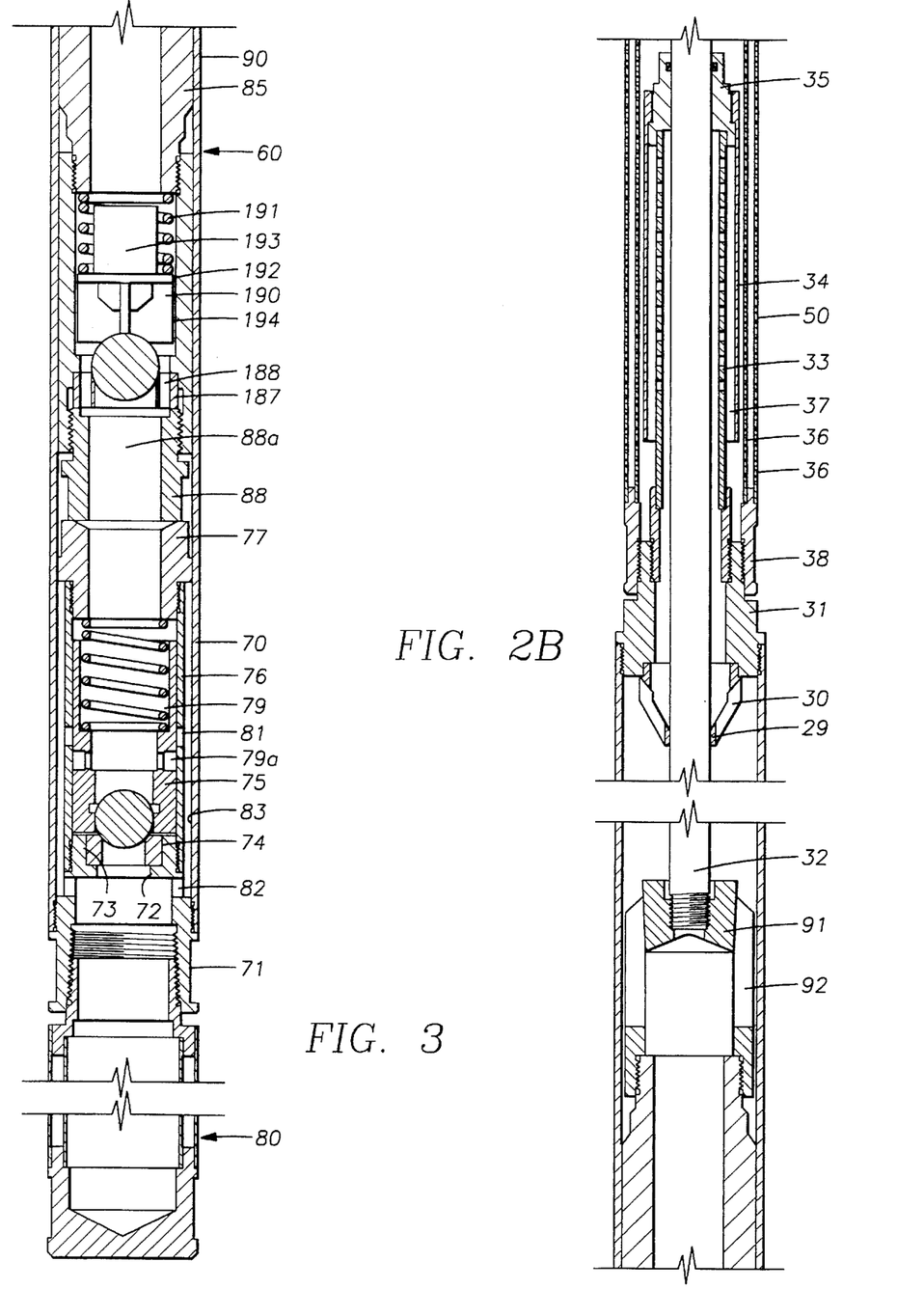
FIG. 3 shows another embodiment of a portion of the structure shown in FIG. 2A.

The engine section 60 is slidably received within the housing 90 above the sensor valve assembly 70. The engine section consists of axially extending elements comprising a piston 85, a cage 86 connected to the piston, a metering orifice seat 87, received within the lower end of the cage, and an annular seat retaining plug 88, having a cavity 88a therein, attached to the lower end of the cage 86 and securing the metering orifice seat in place. The metering orifice seat is provided with an orifice 89 therethrough to conduct fluid between the interior of the cage 86 and the bore of the seat retaining plug 88. As seen in FIG. 2B, an upper cage 91 is threadingly connected to the upper end of piston 85 and is provided with radial openings 92 to provide fluid communication with a cavity 93 which is between the engine section 60 and the filter section 50. An actuator rod 32 extends upwardly from the upper cage 91 through the filter section 50. The filter section is mounted on a coupling 31 which is threadedly engaged with the upper end of engine housing member 90. At its lower end the connector 31 is provided with a rod guide 29 which has openings 30 therethrough for fluid communication between the cavity 93 and the interior of the inner perforated tube 33 of the filter section 50. The collar 35 is preferably provided with an O-ring 37 or other suitable seal to sealingly engage the rod 32 to prevent fluid flow through the collar between the interior of the filter section and the space above the collar.

Figure 2C:
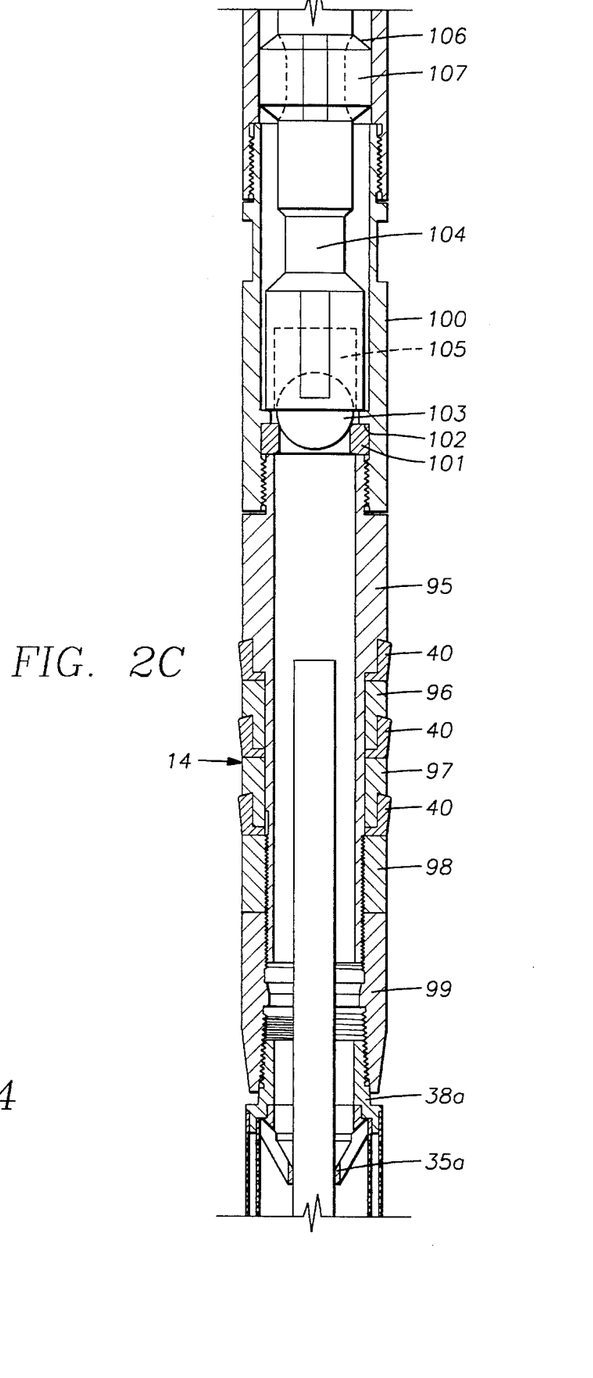

The filter section comprises an inner perforated tube 33 threadedly engaged at its lower end with a connector 31 which is in turn threadedly connected to the tubular housing 90. At its upper end the inner tube 33 is connected to a collar 35 which slidably engages the actuator rod 32 which extends axially of the collar. An imperforate shroud 34 surrounds and is spaced away from the inner perforated tube, and is also connected at its upper end to the collar 35. The shroud extends downwardly from the collar 35, terminating above the connection of the inner perforated tube 33 to the coupling 31, but below the lowest extent of the apertures in the inner perforated tube, thereby allowing fluid communication between the exterior of the shroud and the exterior of the inner tube. One or more permeable filter elements 36 surround and are spaced away from the shroud 34, the filter elements being connected at their lower end to a coupling 38 and at their upper end to another coupling 38a (See FIG. 3C) which is spaced upwardly above coupling 35 to allow fluid communication between the annulus intermediate the filter elements 36 and the shroud 34 and the interior of the coupling 38a.

The coupling 38a is connected to a pump hold-down assembly 14 which comprises a plurality of upwardly facing cup seals 40 for sealingly engaging the bore of the tubing in which the pumping system is installed and holding the pumping system in place. A mandrel 95 is provided on which the cup seals are mounted between rings 96, 97 and locknut 98, the mandrel being threadingly engaged with locknut 98 and with a coupling 99 which is connected to coupling 38a.

Figure 2D:
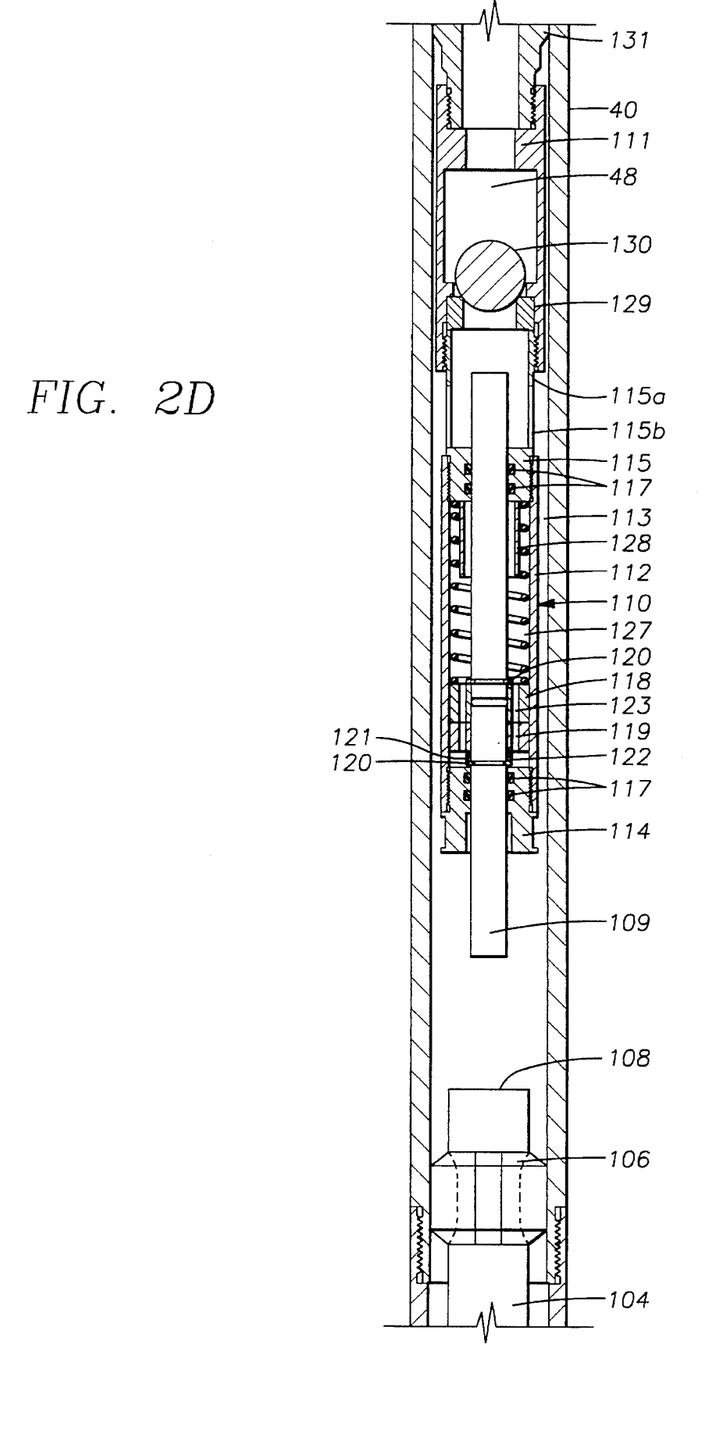

The upper end of the mandrel 95 is threadingly engaged with a standing valve housing 100 and retains a standing valve seat 101 against an annular shoulder 102 within the standing valve housing. The standing valve 103 seats on the seat 101. A trigger sub 104 is longitudinally slidably received within the pump barrel 40 above the standing valve and has a downwardly facing cup shaped cavity 105 proportioned to receive the standing valve ball when the valve is opened. The trigger sub is also provided with two guide elements 106 which slidingly engage the surrounding housing and which are provided with longitudinal grooves 107 to allow fluid passage longitudinally around the trigger sub. The upper end of the trigger sub has a flat hammer face 108, as seen in FIG. 2D.

The hammer face 108 is positioned to engage the lower end of a push rod 109 upon upward movement of the trigger sub 104. The push rod 109 is centrally disposed within a reference cell 110 which is suspended from a pump plunger cage 111, and is the lowest element in the reciprocable pump plunger suspended from the sucker rod string 28.

Reference cell 110 is received within the pump barrel 40 and comprises a tubular housing 112 having a diameter less than the inside diameter of the barrel to form an annular space 113 therebetween for passage of well fluid. The housing 112 is closed at the lower end by a bottom plug 114 and at the upper end by an upper plug 115. Each plug has a central bore 116 dimensioned to fit closely around the push rod 109. O-rings 117 between the rod and the bore provide a fluid-fight seal to prevent fluids from leaking into or out of the reference cell. The upper plug includes an upwardly extending tubular portion 115a which is threadedly engaged with the pump plunger cage 111 to provide support for the reference cell. Ports 115b in the tubular portion allow fluid flow from the annulus surrounding it to the plunger cage. The reference cell is filled with a viscous fluid whose viscosity is substantially unaffected by temperature variations within the usual range of temperatures encountered in oil and gas wells. Within the reference cell, two metering spools 118, 119 are mounted on the push rod 109. Spool 118 is held in a fixed position on rod 109 by retaining tings 120, which may be conventional snap tings. Spool 119 is slidably positioned on the rod, and is resiliently biased upwardly into engagement with spool 118 by a spring 121 which is supported on another retaining ting 120 and a washer 122. Axial ports 123 allow fluid flow through spool 118, and smaller axial metering ports 124 allow fluid flow through spool 119. Spool 118 sealingly and slidingly engages, by means of seals 125, which may be O-rings, the inside wall of the housing 112, and also sealingly engages, by means of seal 126, which may be an O-ring, the rod 109. Spool 119 slidingly engages both the interior of housing 112 and the rod 109, but need not be sealed with respect to either. A compression spring 127, which may be a coil spring, extends from the upper plug 115 to the spool 118, biassing the spool downwardly. A stop 128 extends downwardly from the upper plug.

Figure 2E:
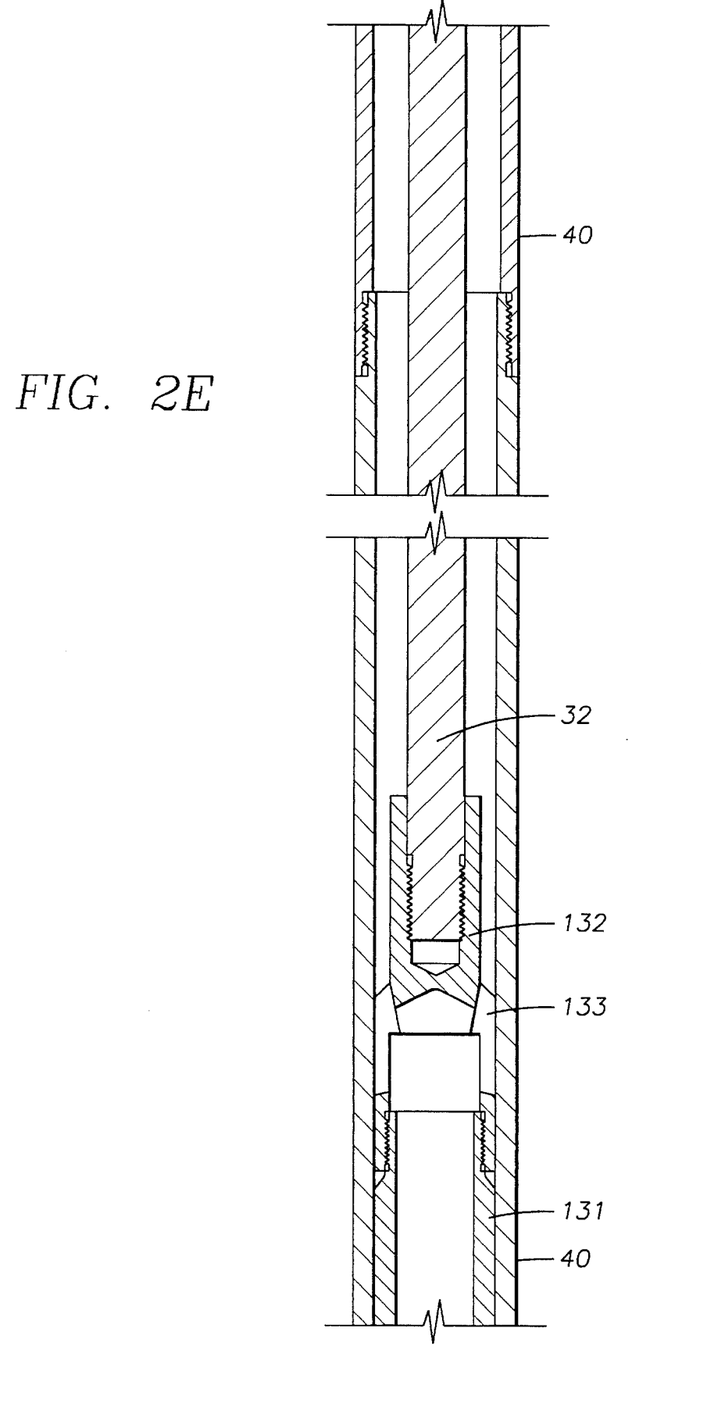
Figure 2F:
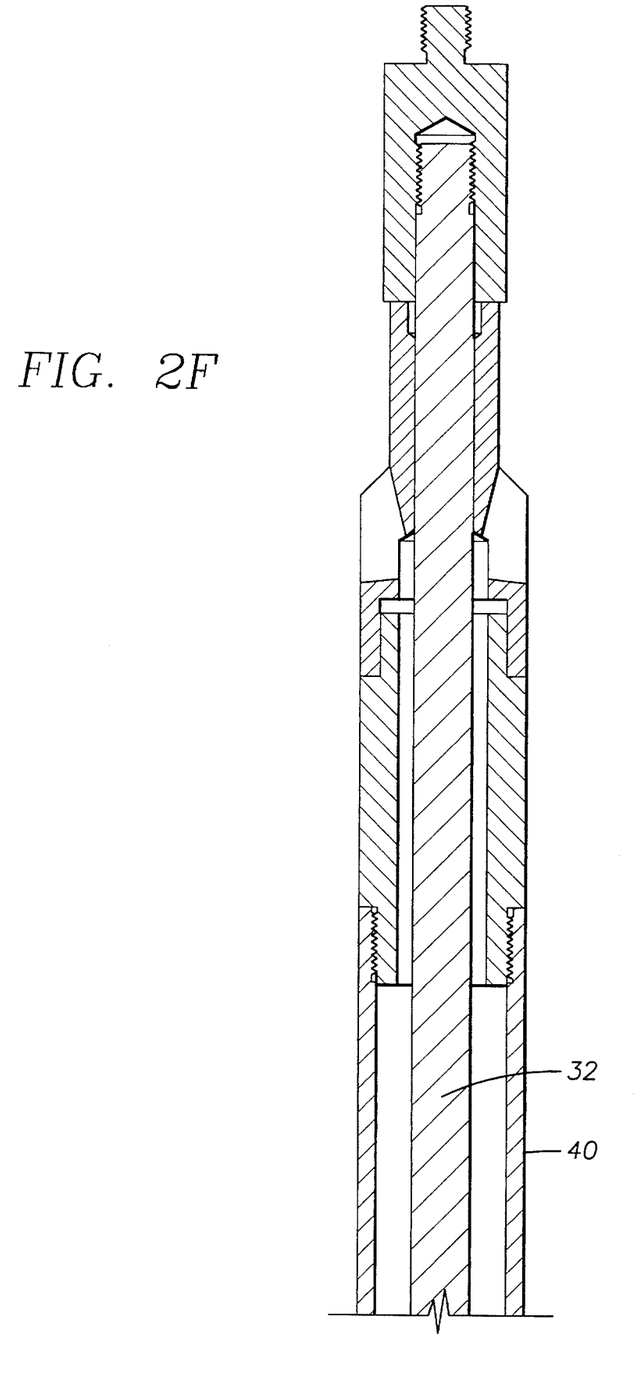

Pump plunger cage 111 may be a conventional plunger pump cage freely movable within the barrel 40 and having a ball seat 129, held in place by the upper end of the tubular extension 115a of the upper plug 115, and a ball valve 130, forming a conventional travelling valve, which in closed position inhibits flow of fluid from above the travelling valve to below it. Pump plunger 131 is threadedly connected to the upper end of the cage 111 and comprises a conventional pump plunger which sealingly engages the inside diameter of the barrel 40. As seen in FIG. 2E, the upper end of the pump plunger is connected to a transition sub 132 which connects the pump plunger to the plunger rod 32. The transition sub is provided with ports 133 which allow flow of fluid between the bore of the pump plunger and the bore of the barrel 40 above the pump plunger. As shown in FIG. 2F, the plunger rod is connected to the sucker rod sub 30.

Operation

The operation of the pumping jack 20 causes reciprocation of the polish rod 22, which in turn reciprocates the pump plunger 131. The pump plunger is connected to the reference cell 110, so it is reciprocated as well. As the pump plunger moves downwardly within the barrel 40, well fluids in the barrel lift the ball valves 130 and 103 off their respective seats. As the pump plunger moves upwardly, the ball valves are seated, and fluid above the travelling valve 130 is lifted up the length of the stroke of the pump plunger, thereby producing well fluids at the well head 24, while at the same time allowing additional well fluid to flow into the barrel from the filter section 50, by means of the openings in the permeable falter elements 36 and the annulus between the filter elements and the shroud 34, passing upwardly around the collar 35 and through the packoff mandrel 95.

As well fluids flow into filter section 50, sand and other solid particles carried with the well fluids are restrained by the falter elements 36, with the particulate material either adhering to the exterior of the filter elements or being caught within pores. In time, with continued loading of particulate materials, the filter elements will begin to plug up and restrict flow of well fluids, creating a pressure differential across the filter elements during upward strokes of the plunger, so that the pressure of the well fluids within the pumping system is significantly less than the pressure of the well fluids in the well tubing surrounding the pumping system.

The well fluid within the falter section is in communication with the interior of the engine section 60 and the interior of the sensor valve assembly 70, through the orifice 89, so that a reduction of the pressure in the falter section also reduces the pressure holding the ball valve 78 on its seat 74, causing a pressure differential across the ball valve which tends to lift it off the seat. When the force of this pressure differential exceeds the load of the spring 79 the ball valve is lifted off the seat, allowing tubing pressure, i.e. the pressure of the well fluid surrounding the sensor valve assembly, to be applied against the lower end of the spool valve 75. The area then exposed to tubing pressure is much greater, preferably five to ten times greater, than the area of the ball exposed to tubing pressure when it is seated. Thus the differential pressure is great enough to move the spool valve 75 upwardly until it engages the lower end of valve head 77. This movement brings radial openings 79a into alignment with radial openings 81. Well fluid may then flow from the tubing bore through the filter 80, the ports 71a, the annular space 76a, the sensor valve ports 79a and 81, the interior of the sensor valve and the cavity 88a in the seat retaining plug 88. The purpose of the orifice 89 is to relieve pressure surges from below the piston, so the orifice is small enough that there is a substantial pressure differential across the metering orifice seat, applying an upward force against the seat retaining plug 88 sufficient to move the engine piston 85 upwardly and thereby move the actuating rod 32 upwardly to engage the valve ball 103 of the standing valve and lift it off the valve seat 101. The actuating rod 32 continues upwardly to engage the top of the cavity 105 in the trigger sub 104, and then lifts the trigger sub upwardly until its upper end 108 is in a position to engage the push rod 109 on the next downward stroke of the pump plunger, moving the push rod upwardly with respect to the plunger until the upper end 108 of the trigger sub engages the lower plug 114 of the reference cell, so that the load of the pump plunger is exerted against the trigger sub. The upward movement will also cause the upper end of push rod 109 to move upwardly within the reference cell 110 to engage ball valve 130 of the travelling valve. The push rod 109 continues to move upwardly, carrying the metering spools 118, 119 upwardly through the viscous fluid within the tubular housing 112. Spool 119 will separate from spool 118 during this upward movement, against the force of spring 121, allowing the viscous fluid to flow comparatively freely downwardly through the larger ports 123 in the upper spool 118, until the upper spool engages the stop 128. The travelling valve is therefore opened and held open, allowing well fluid in the barrel above the plunger pump to flow downwardly through the annulus around the reference cell 110, past the trigger sub 104, through open standing valve seat 101 to the filter section 50 and through the outer permeable filter elements 36 to dislodge particulate material. The particulate material then falls to the bottom of the well.

When the metering spools in the reference cell are at the limit of their upward travel, the spring 121 closes spool 119 against spool 118, so that the viscous fluid can flow upwardly past the metering spools only through the smaller axial metering ports 124 in spool 119. Spring 127 biases the metering spools downwardly, and the force of downwardly flowing well fluid on push rod 109 also urges the metering spools downwardly. Such downward movement is restricted by the metering spools, and the flow of the viscous fluid through the metering ports acts to determine the time that the push rod bears against valve ball 130 and holds the ball off seat 129. This timing is a function of the viscosity of the fluid within the reference cell 110 and the size of the metering ports, as well as the weight of the push rod and the head of well fluid above the reference cell. Well fluid will continue to flow downwardly until the push rod 109 is retracted so that the travelling valve 130 can close. This back flushing of the filter elements may continue for only a few seconds, or for one or more cycles of the pump, depending upon the designed characteristics of reference cell elements, such as the size of the ports in the metering spool 119, to insure that the particulate material washed from the filter elements falls downwardly well below the filter section before the pump begins pumping again, to avoid picking up the same particulate material.

Downward movement of push rod 109 is restricted so long as it is being engaged by the trigger sub 104. However, when the back washing of the permeable elements 36 is begun, the fluid pressure of the well fluid within the pump is applied to cause fluid flow also around the shroud 34 in the filter section 50, and through the perforated tube 33, down through the engine section 60. This eliminates the pressure differential holding the engine piston up. Pressure differential across the sensor valve assembly 70 will also be eliminated, so the spring 79 can push the ball valve 78 to closed position, ready for the next actuation cycle when the permeable elements of the filter section are loaded again. With no pressure differential to hold it up, the weight of the piston 85 will cause it to tend to move downwardly. However, the rate of downward movement is controlled by the size of orifice 89, through which fluid below the piston must flow to allow the piston to move downwardly. The rate of movement may therefore be designed in by means of the size of the orifice. Downward movement of the piston will retract actuator rod 32 so that it will no longer resist downward movement of push rod 109, and will allow standing valve ball 103 to seat. The sensor valve and the orifice 89 are dimensioned so that the downward movement of the piston and the resetting of the sensor valve occur after the backwash cycle is completed.

It is important that when a backwash cycle is initiated, the upward force on the spool valve 75 is in excess of that required to hold the valve fully actuated, even with pressure differential fluctuations resulting from well fluid entering the spool valve, so that the force is sufficient to lift the engine piston 85. The fluid entering the spool valve reduces the pressure differential almost as soon as it is applied, and must increase in pressure enough to force the piston 85 upwardly.

It has been determined that a ratio of the opening force to the force required to hold the spool valve in fully opened position is preferably five or ten to one. Thus, if the differential pressure is 100 psi, and a ratio of five to one is used, the spool valve will not return to its closed position until the pressure differential drops to 20 psi. Neglecting fluid frictional losses, 80% of the differential pressure is therefore available to do the work of actuating the engine piston while still maintaining the spool valve in open position. It can be readily seen that the higher the ratio of the sensor valve, the higher the operating efficiency and percentage of energy delivered from the well bore is available to actuate the engine piston.

As previously noted, the viscous fluid used in the reference cell 110 is substantially viscosity stable at normal well operating pressures at temperatures typically ranging from 50° to 300° F. Such stability is an important factor in proper functioning of the reference cell. A synthesized silicone based oil, such as Dow Corning 200 Fluid @ 500 CS, produced by Dow Corning Company, has been found to be satisfactory for this purpose. Other fluids may be used as the application may warrant, provided they achieve the necessary viscosity stability.

FIG. 3 shows an alternative structure for the metering orifice 89 shown in the engine section in FIG. 2A. In this embodiment metering orifice seat 87 is replaced by a ball valve seat 187 having one or more bypass orifices, such as orifices 188. A ball check valve 189 rests on the seat, and cage 190 is biassed downwardly against the ball by a spring 191 which engages a flange 192 of the cage. The ball check valve and spring pressure are sized to hold the valve closed under the force required to actuate the engine piston, but to allow the valve to open when a pressure surge is incurred. An upper extension 193 of the cage guides it to maintain the cage wings 194 in proper contact with the ball. This structure functions to relieve pressure surges on the sensor valve assembly which may occur when the trigger sub strikes the reference cell. Such a pressure surge could result in premature closing of the sensor valve.

Figure 4:
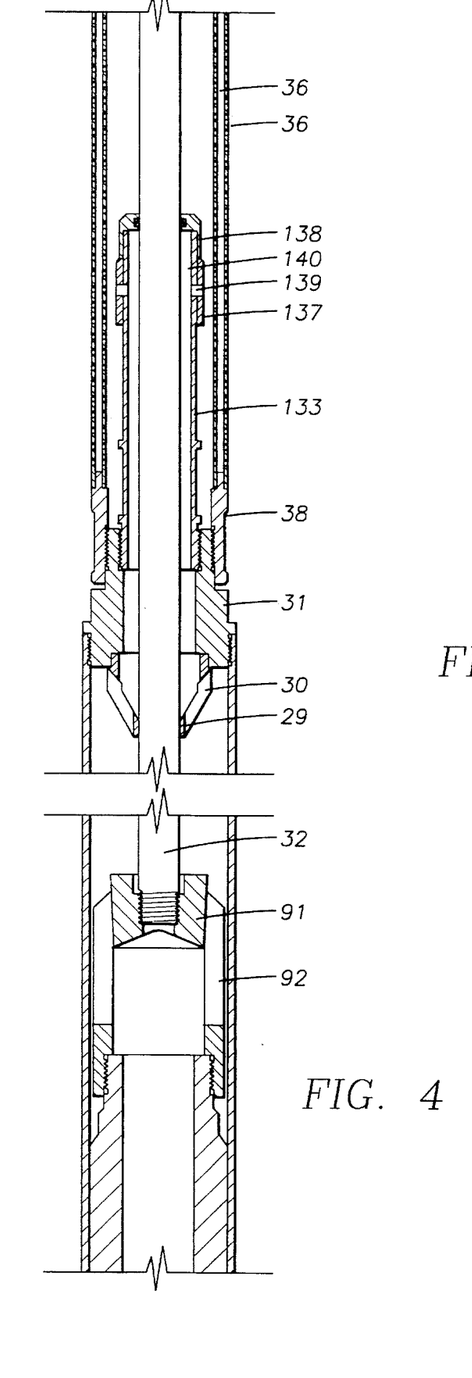
FIG. 4 shows another embodiment of a portion of the structure shown in FIG. 2B.

FIG. 4 provides an alternative structure for the inner perforated tube 33 and the shroud 34. The perforated tube 33 is replaced by a tube 133 which extends upwardly from rod guide 29 and terminates below rod guide 35A. Tube 133 has a cup-shaped cover 137 slidably mounted on its upper end, the cover being provided with radial ports 138 through which fluid may flow when the cover is in its upper position. Seal 141, which may be an O-ring, provides sealing engagement of the cover with the actuator rod 32. When there is sufficient differential fluid pressure below the cover within the tube, the cover slides upwardly the distance allowed by pins 139 which slide in slots 140 in the upper extension, so that the ports 138 are above the top of the upper extension. When there is no such differential pressure, as during normal operation of the pump, this alternative design will prevent dirt or sand from falling into the engine piston.

The apparatus and method of this invention may also be used in conjunction with well treatment with chemicals, providing automatic injection of chemicals. A chemical container 134, as shown in FIG. 1, may be connected to the well head 24 with a hose 135 from the container inserted so that the vacuum generated in the well head will pull chemicals from the container each time the filter is back washed, to inject the chemicals into the well.

In the preferred embodiment, permeable filter elements 36 are precision, stainless wire wrapped, perforated tubes which, through subsequent processing and metallurgical fusing creates a rugged highly permeable precision tubular membrane. This precision membrane possesses many desirable qualities for the application including low well fluid passage pressure drop across a broad range of viscosities encountered in petroleum production wells. This filter membrane also performs efficiently with regard to its release of the built up particulates upon back flush cycling. The commercially available embodiment of this preferred filter media membrane is sold by Stren Company of Houston, Texas under its trademarks "PumpCard" and "HiFlo Precision Stainless Steel Cartridge System." These cartridges presently are in use in PumpCard™ tools sold by the aforementioned Stren Company in successful service to the petroleum production industry. They are presently being serviced, when they become loaded and require retrieval from the well for cleaning, by washing them off, commonly with a pressure washer water spray at the pump repair shop. This precision stainless cartridge type may be preferably used with or without an outer perforated protective sleeve placed over the precision membrane. These cartridges are generally available in filtration ratings of 25 and 50 microns, and may be additionally manufactured at a broad range of micron ratings, as may be desirably employed for the range of well fluid conditions to be pumped. The permeable filter elements 36 could also be media bodies having small tortuous passages therethrough having a nominal size of about 0.0004 inches, which narrow as they pass through the elements 36 from the outside to the inside. Another product which can be used is a casting of acrylic fibers impregnated with phenolic resin, with the passages formed therein formed randomly therein during casting. One suitable product is sold by Cuno, Inc. of Meridian, Conn. and identified by the registered trademark "Micro-Klean." The permeable filter elements 36 may include grooves cut therein to increase the number of passages extending through filter portion 40. Other filtering media, including screening, may be used. Tubular screens of the "V-Wire" and other profile wire types as sold by Johnson Filtration Systems, Inc. of St. Paul, Minn., and other brands may be used as may be desirable under certain conditions. Perforated tube 33 may be made of the same material as the permeable filter elements 36, and typically is of finer micron rating to exclude particulates from entering the engine cavity.

The overall pump configuration described is classified, under American Petroleum Institute specifications for rod pumps entitled "API 11 AX", as an "RHBE insert" type of pump. However, the invention is also applicable to other rod pumps of typical designations such as RWBC, tubing pumps and the like. In addition, the concept of the invention is also applicable to other types of pumps.

Several embodiments of the invention are shown and described, but the invention also includes all variations within the scope of the appended claims, and equivalents thereof.

I claim:

1. A filter assembly configured and arranged for filtering particulate matter from well fluid to be pumped by a downhole pump in a well, said pump including an inlet valve, including:

a filter member positioned to filter particulate material from well fluid before the well fluid enters the pump, an actuator operable in response to a pressure differential across the filter member resulting from a preselected level of particulate loading of the filter member, to engage said valve to open it to allow well fluid to flow from the pump through said filter member in a direction to dislodge particulate matter from said filter member, said actuator including a reference cell which controls the time during which well fluid flows in such direction.

2. A filter assembly as defined by claim 1 in which the reference cell includes a rod movable to a position to engage said inlet valve to open it, said rod passing through a viscous fluid, and a metering device on said rod in said viscous fluid to restrain movement of said rod away from engagement with said inlet valve, and including a triggering device positioned to actuate movement of said rod in response to said pressure differential.

3. A filter assembly as defined by claim 2 and including a sensor valve assembly including a check valve having a first side exposed to the pressure of the well fluid in the well below the filter member and a second side exposed to the pressure of fluid within the filter assembly on the other side, a spring biassing the check valve to closure against the pressure in the well, said check valve being movable in response to a preselected decrease in the pressure within the filter assembly to move to a position which increases the area of the first side exposed to the pressure in the well and which opens the valve to allow fluid from the well to apply pressure to energize the triggering device.

4. A filter assembly configured and arranged for filtering particulate matter from well fluid to be pumped by a downhole pump in a well, including:

a filter member positioned to filter particulate material from well fluid before the well fluid enters the pump, an actuator located within said well and operable in response to a preselected level of particulate loading of the filter member, positioned to allow well fluid in the well above the filter member to flow through said filter member in a direction to dislodge particulate matter from said filter member, and a timer engaging said actuator to control the amount of time the well fluid flows in said direction.

5. A filter assembly as defined by claim 2, wherein said actuator is operated by the pressure differential across the filter member which exists during pump operation.

6. An oil well pumping system comprising a downhole pump having an elongate pump barrel open at its lower end with a standing valve positioned to close said opening to prevent flow downwardly therethrough, and a plunger in said barrel, said plunger having a traveling valve therein and being reciprocable in said barrel to pump well fluids from said barrel;

an annular filter suspended below said pump to filter particulate matter from the oil well fluids, with the exterior of the filter being exposed to well fluids in the oil well and the interior of said filter being in communication with the lower opening of said barrel to conduct well fluids which pass through said filter from the oil well to the lower opening of the barrel;

an actuator, actuable in response to a preselected level of particulate loading of the filter, positioned to allow well fluids above the filter to flow through said filter in a direction to dislodge particulate matter; and a timer engaging said actuator to control the amount of time the well fluid flows in said direction.

7. An oil well pumping system as defined by claim 6, wherein said actuator is actuated by the pressure differential across the filter produced by operation of the pump.

8. An oil well pumping system as defined by claim 7, wherein the actuator includes a push rod positioned between the standing valve and the traveling valve, and an actuator rod below the standing valve, said actuator rod being operable in response to said pressure differential to move into engagement with the standing valve to open it and to impart upward movement to the push rod to move it into engagement with and to open the traveling valve.

9. An oil well pumping system as defined by claim 8 and including a sensor valve assembly including a check valve having a first side exposed to the pressure of the well fluid in the well below the filter member and a second side exposed to the pressure of fluid within the filter assembly on the other side, a spring biasing the check valve to closure against the pressure in the well, said check valve being movable in response to a preselected decrease in the pressure within the filter assembly to move to a position which increases the area of the first side exposed to the pressure in the well and which opens the valve to allow fluid from the well to apply pressure to energize the actuating rod.

10. A method for filtering particulate matter from well fluid being pumped from an oil well by a downhole pump, comprising operating a downhole pump to cause well fluid to flow from a lower location in a well bore to a higher location in a well bore, causing said well fluid to flow through a filter while flowing from said lower location to said higher location so that the filter becomes loaded with particulate matter, creating a differential pressure across the filter, causing the well fluid to flow downwardly from said higher location to said lower location through the filter, in response to a preselected differential pressure across the filter acting on an actuator member within said well, and terminating the downward flow of the well fluid upon the expiration of a preselected time.

11. A method for pumping well fluids from an oil well comprising:

installing in the oil well a downhole pump having an elongate pump barrel open at its lower end with a standing valve positioned to close said opening to prevent flow downwardly therethrough, and a plunger in said barrel, said plunger having a traveling valve therein and being reciprocable in said barrel to pump well fluids from said barrel;

suspending beneath the pump an annular filter to filter particulate matter from the oil well fluids, with the exterior of the filter being exposed to well fluids in the oil well containing particulate matter and the interior of said filter being in communication with the lower opening of said barrel to conduct well fluids which pass through said filter from the oil well to the lower opening of the barrel;

operating said pump to pump well fluids from the well bore through said filter, whereby particulate matter loads the filter to a preselected level;

in response to said preselected level of particulate loading of the filter, causing well fluids above the filter to flow through said filter in a direction to dislodge particulate matter; and in response to the expiration of a preselected of time terminating the flow of well fluids in said direction.

12. A method for treating a well with chemicals comprising operating a downhole pump to cause well fluid to flow from a lower location in a well bore to a higher location in a well bore, causing said well fluid to flow through a filter while flowing from said lower location to said higher location so that the filter becomes loaded with particulate matter, creating a differential pressure across the filter, causing the well fluid to flow downwardly from said higher location to said lower location through the filter, in response to a preselected differential pressure across the filter acting on an actuator member within said well, and injecting a well treatment chemical into the downwardly flowing well fluid.

* * * * *